(12) United States Patent
Mahlein et al.

(10) Patent No.: US 8,912,738 B2
(45) Date of Patent: Dec. 16, 2014

(54) DRIVE SYSTEM, METHOD FOR OPERATING A DRIVE SYSTEM, AND USE

(75) Inventors: Jochen Mahlein, Karlsruhe (DE); Hans Jürgen Kollar, Bruchsal (DE); Marek Lewandowski, Renningen (DE); Matthias Hauck, Schwetzingen (DE); Leobald Podbielski, Karlsruhe (DE); Josef Schmidt, Graben-Neudorf (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 7 days.

(21) Appl. No.: 13/260,688

(22) PCT Filed: Mar. 17, 2010

(86) PCT No.: PCT/EP2010/001661
§ 371 (c)(1),
(2), (4) Date: Sep. 27, 2011

(87) PCT Pub. No.: WO2010/108623
PCT Pub. Date: Sep. 30, 2010

(65) Prior Publication Data
US 2012/0019174 A1 Jan. 26, 2012

(30) Foreign Application Priority Data
Mar. 27, 2009 (DE) .......... 10 2009 014 704

(51) Int. Cl.
*H02P 1/00* (2006.01)
*H02J 5/00* (2006.01)
*B60L 11/18* (2006.01)
*B60L 15/00* (2006.01)
*H02J 7/02* (2006.01)

(52) U.S. Cl.
CPC ............. *B60L 11/1811* (2013.01); *H02J 5/005* (2013.01); *B60L 11/1803* (2013.01); *B60L 2220/64* (2013.01); *Y02T 10/642* (2013.01);
(Continued)

(58) Field of Classification Search
USPC ............ 318/139, 700; 363/132, 137, 34, 135, 363/98, 108, 109
See application file for complete search history.

(56) References Cited

U.S. PATENT DOCUMENTS 3,784,841 A * 1/1974 Hosaka ........................... 307/64
4,685,043 A * 8/1987 Mehnert .......................... 363/43
(Continued)

FOREIGN PATENT DOCUMENTS

DE 41 07 391 9/1992
DE 41 28 962 3/1993
(Continued)

OTHER PUBLICATIONS

International Search Report, issued in corresponding International Application No. PCT/EP2010/001661.
(Continued)

*Primary Examiner* — Eduardo Colon Santana
*Assistant Examiner* — Bickey Dhakal
(74) *Attorney, Agent, or Firm* — Kenyon & Kenyon LLP

(57) ABSTRACT

A drive system and method for operating a drive system, including an electromotor, inverter, energy store,
the electromotor being able to be supplied from the inverter, which is supplyable from the energy store,
a current able to be controlled by a switch being supplyable to at least one stator winding of the electromotor, which is supplied from an electrical energy source that differs from the energy store.

12 Claims, 1 Drawing Sheet

(52) U.S. Cl.
CPC .............. *B60L 15/007* (2013.01); *H02J 7/022* (2013.01); *H02P 2209/01* (2013.01); *Y02T 10/641* (2013.01); *Y02T 10/7088* (2013.01); *Y02T 90/14* (2013.01); *B60L 11/1812* (2013.01); *Y02T 90/127* (2013.01); *Y02T 90/122* (2013.01); *B60L 11/1814* (2013.01); *Y02T 10/7005* (2013.01); *B60L 11/182* (2013.01)
USPC ................ 318/139; 363/34; 363/132; 363/98

(56) References Cited

U.S. PATENT DOCUMENTS

| | | | | |
|---|---|---|---|---|
| 5,341,280 | A * | 8/1994 | Divan et al. | 363/37 |
| 6,058,032 | A | 5/2000 | Yamanaka et al. | |
| 6,066,928 | A | 5/2000 | Kinoshita et al. | |
| 6,515,878 | B1 | 2/2003 | Meins et al. | |
| 7,277,302 | B2 * | 10/2007 | Gazel et al. | 363/5 |
| 2005/0105311 | A1 | 5/2005 | Soldano | |
| 2008/0186742 | A1 * | 8/2008 | Seong | 363/17 |

FOREIGN PATENT DOCUMENTS

| | | |
|---|---|---|
| DE | 198 57 645 | 6/1999 |
| DE | 698 36 468 | 9/2007 |
| DE | 10 2006 022 223 | 11/2007 |
| DE | 10 2006 043 960 | 4/2008 |
| EP | 0 834 977 | 4/1998 |
| EP | 834977 A2 * | 4/1998 |
| JP | 05207664 A * | 8/1993 |
| JP | 07115704 A * | 5/1995 |
| JP | 08103004 A * | 4/1996 |
| JP | 11098713 A * | 4/1999 |
| JP | 2002-165370 | 6/2002 |

OTHER PUBLICATIONS

Written Opinion, issued in corresponding International Application No. PCT/EP2010/001661.

International Preliminary Report on Patentability, issued in corresponding International Application No. PCT/EP2010/001661.

* cited by examiner

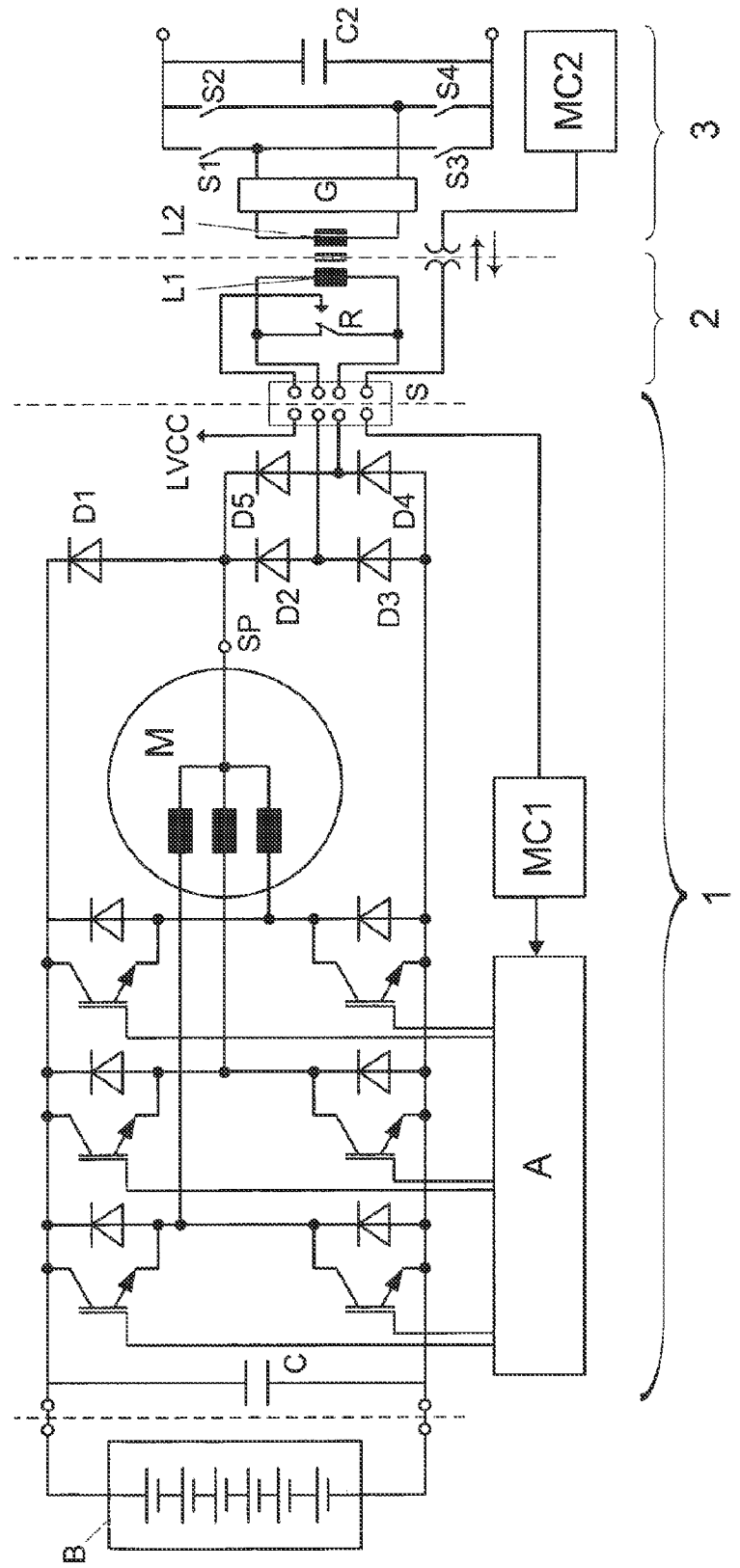

DRIVE SYSTEM, METHOD FOR OPERATING A DRIVE SYSTEM, AND USE

FIELD OF THE INVENTION

The present invention relates to a drive system, a method for operating a drive system, and a use.

BACKGROUND INFORMATION

It is known to use inverters to supply electromotors, the inverter being supplied from an energy store, e.g., an intermediate circuit capacitor of an inverter. In the case of battery-supplied vehicles having an electromotive drive, it also is obvious to supply the electromotor from an inverter supplied by the battery.

SUMMARY

Example embodiments of the present invention provide a cost-effective charging circuit for an energy store.

Among features of example embodiments of the present invention of the drive system are that the drive system includes an electromotor, an inverter, and at least one energy store, the electromotor being supplyable from the inverter, which is able to be supplied from the energy store, the electromotor being implemented as a three-phase a.c. motor in a star connection, the star point of the electromotor being supplyable with current from a rectifier, which is supplied from a secondary winding, the secondary winding being supplyable from a primary winding, which is inductively coupled to the secondary winding.

In this manner, it is advantageously possible to provide a very compact charging circuit; it is even possible for a considerably lower voltage level to exist at the secondary winding than the voltage required for charging the energy store. Since the stator winding is connected to the energy store via the inverter, and thus may be used as inductivity for the charging circuit, for instance in the manner of a Buck converter, even makes it possible to raise the voltage level from the secondary voltage to the required charging voltage. In other words, a charging circuit which has a broad-range voltage supply is provided.

If the secondary voltage is of sufficient magnitude, i.e., lies above a first critical value, the energy store may be charged directly from the secondary winding.

If the secondary voltage is too high, i.e., if it lies above a second critical value, starting from which value the energy store is put at risk with a certain probability, discharging of the current via the inverter is made possible, which is to say, the current is routed away from the energy store. Worsening or premature aging or other dangers to the energy store, such as overheating is/are therefore avoidable.

If the secondary voltage is greater than a third critical value, an additional current path implementable without active actuation may be enabled in addition and then be used to reroute the current with high reliability in order to reliably protect the energy store, in particular a higher safety category.

That is to say, if the secondary voltage is below the first critical value, it is advantageous that the stator windings at least partially also provide the function of an additional energy store and, furthermore, that they also contribute to smoothing of the charging current.

A broad voltage range is thus able to be utilized. As a result, charging is possible even when the coupling worsens or in the case of a primary-side supply network that provides a fluctuating or variable voltage. Even an operation using a broad voltage range is possible, that is to say, charging in the case of different supply networks, which differ not only in their frequency but also in their effective voltage.

In example embodiments, the primary winding is supplied from a voltage-current converter, in particular a gyrator, which is supplied with an alternating voltage from an inverter, the voltage-current converter including at least one capacity and one inductivity such that the associated resonant frequency substantially corresponds to the frequency of the alternating voltage, the capacity and the inductivity being connected in series, in particular. This has the advantage that the voltage-source-type behavior of the single-phase inverter feeding the primary winding is converted into a current-source-type behavior, which makes it possible to supply a substantially constant current. In this manner, high efficiency in the contactless energy transmission to the secondary coil is able to be achieved, even if the inductive coupling is weak.

In example embodiments, if a first critical value of the voltage at the star point is exceeded, the charging current is discharged directly from the rectifier to the energy store(s) with the aid of a diode, the first critical value corresponding to the charging voltage for the energy store(s), in particular. This has the advantage that no further losses occur, but the full, contactlessly transmitted energy is available for charging the energy store.

If the first critical value of the voltage at the star point is undershot, in example embodiments, the charging current is routed from the rectifier to the energy store(s) via at least one stator winding and the inverter; it is possible, in particular, to operate the inverter together with the stator windings as boost chopper. This has the advantage that the low voltage at the secondary coil may be boosted, so that charging is possible despite this low voltage.

In example embodiments, a switch, via which current is discharged from the star point to the lower potential, is closed if a second critical value that is greater than the first critical value is exceeded. This is advantageous insofar as the energy stores are able to be protected from overcharging.

In example embodiments, one of the energy stores, or the energy stores, is/are a capacitor, an ultracap capacitor, or a battery. This has the advantage that, depending on the requirements, a capacity is selectable that ensures the operation of the intended application.

In example embodiments, the stator windings of the electromotor are interconnected in a star connection. This has the advantage that all stator windings are easily able to be used as inductivities of the charging circuit. In particular when the inverter connected to the stator windings is used as boost chopper, the charging current is able to be distributed to the stator windings. The Ohmic waste heat outputs are thus able to be reduced.

In example embodiments, an additional inductivity is provided between the star point and the rectifier. This has the advantage that lower switching frequencies of the inverter may be used to generate current of equal magnitude in the individual stator windings, which then also makes it possible to reduce the switching losses of the semiconductor switches included in the inverter. In addition, greater voltage differences may exist between the charging voltage and the voltage level of the energy source. It is also advantageous that the current is distributed to the stator windings, so that lower losses are achievable.

In example embodiments, the effective value or peak value of the secondary voltage supplying the rectifier is less than the charging voltage for the energy store, and thus, in particular, lower than the voltage required for charging the energy store, especially the input voltage of the inverter. This has the advantage that an energy source which uses a broad voltage range is able to be employed as energy source supplying the switch.

Among features of the method for operating a drive system are that the star point of the electromotor is supplied with current from a rectifier, which is supplied from a secondary winding, the secondary winding being supplied in contactless manner from a primary winding, charging current for the energy store being produced by an inverter, via which the stator windings of the electromotor are supplyable, in particular using a three-phase voltage system, which is generated in motive operation when the inverter is supplied from the energy store, as long as the voltage arising at the star point is below a first critical value.

This is advantageous insofar as a charge method that utilizes the stator windings of the electromotor, which is available anyway, may be used to charge the energy source. Thus, not only is it possible to use a broad range voltage as secondary voltage and thus as energy source for the charging circuit, but a very compact arrangement is possible as well, because the stator windings of the motor are used for operating a charge circuit.

In example embodiments, the charging current is supplied to the energy store directly from the rectifier, as long as the voltage arising at the star point is above the first critical value. This has the advantage that no further losses occur.

In example embodiments, at least one of the lower switches of the inverter is transferred into the conducting state, so that current is shunted from the rectifier via the associated stator winding to the lower potential of the energy store, that is to say, the energy store in particular is protected from current from the rectifier, as long as the voltage arising at the star point is above a second critical value which is greater than the first critical value, and whose exceedance with a certain probability poses a risk to the energy store. This advantageously makes it possible to achieve a high degree of reliability.

In example embodiments, an additional current path is enabled, via which current from the rectifier is shunted to the lower potential of the energy store, either directly or via the associated stator winding, that is to say, the energy store in particular is protected from current from the rectifier, as long as the voltage arising at the star point is above a third critical value which is greater than the second critical value, and whose exceedance with a greater probability poses a risk to the energy store, the additional current path in particular being formed by a passive circuit system, the additional current path including a thyristor, in particular, in whose control path a Zener diode or a corresponding component is provided which exhibits a behavior similar to a breaker shaft. This is advantageous insofar as it allows very high reliability to be achieved, due to the fact that the current shunt path is implementable in duplicate.

In example embodiments, the stator windings are supplyable using a three-phase voltage system, which is able to be generated by the energy store. This has the advantage of permitting the use of a conventional inverter, which includes three half-bridges having a series connection of two semiconductor switches in each case, thus making it possible to achieve a pulse-width-modulated actuation for realizing the motive or regenerative operation of the semiconductor switches.

In example embodiments, the inverter is controlled in pulse-width-modulated manner or in block-commutated manner, especially for the motive or regenerative operation of the electromotor. Simple methods may thus be used in an advantageous manner.

In example embodiments, the switches of the inverter are actuated in pulse-width-modulated manner. This has the advantage of providing a simple operating mode; a regulation of the charge current in the direction of a setpoint value is possible as well, in particular, in that the pulse-width modulation ratio may be used as controlled variable.

In example embodiments, the inverter is implemented as multi-phase inverter, and the actuating signals for the switches of the inverter are implemented in synchronous fashion, synchronously at a time offset, or asynchronously. This has the advantage that an especially uncomplicated actuation is possible in a synchronous operating mode, a uniform and independent full utilization of the half-bridges of the inverter and the stator windings is possible in an asynchronous operating mode, and a uniform full utilization of the half-bridges and the stator windings is possible in a synchronous operating mode at a time offset in an uncomplicated manner.

In example embodiments, recharging of the energy store is repeated cyclically, the recharging in particular being performed in alternation with the motive or regenerative operation of the electromotor. This has the advantage that the stator windings only to the maximum of the current arising in the operating modes is possible. As an alternative, simultaneous generation of the charge current in motive and regenerative operating mode of the electromotor is possible, for which purpose the stator windings must have greater dimensions, however.

LIST OF REFERENCE CHARACTERS

1 inverter motor unit
2 charge unit, secondary component
3 charge unit, primary component
D1 diode
D2 diode
D3 diode
D4 diode
D5 diode
S1 switch
S2 switch
S3 switch
S4 switch
C2 capacitor
B energy store, such as battery
C energy store, such as capacitor
S plug connection
M electromotor in star connection
R relay
G gyrator
L1 secondary inductivity
L2 primary inductivity
MC1 first microcontroller
MC2 second microcontroller
A control electronics Example embodiments of the present invention are explained in greater detail below with reference to the Figure.

BRIEF DESCRIPTION OF THE DRAWING

FIG. 1 shows a device according to an example embodiment of the present invention using a schematic circuit diagram.

DETAILED DESCRIPTION

In this context, an inverter is provided for the supply of electromotor M from energy stores B and C switched in parallel, which preferably are implemented as battery and/or capacitor. The stator windings of electromotor M are implemented as three-phase winding in a star connection. Thus, the electromotor is supplyable at a supply frequency which is able to be defined by the inverter, that is to say, by a three-phase voltage system rotating at this supply frequency, and the rotational speed of the electromotor is able to be controlled in this manner; as an alternative, if an angle of rotation sensor or an rpm sensor is installed, the electromotor is controllable to a desired rotational speed or a desired torque.

In regenerative operation, the energy produced by electromotor M may be supplied to the energy store via the inverter.

The inverter includes three half-bridges, i.e. pairs of arms, each including a series connection of an upper and a lower actuable semiconductor switch, to which a diode is connected in parallel in each case. The semiconductor switches are preferably actuated in pulse-width-modulated manner. Control electronics A generates the actuating signals for the semiconductor switches. In motive operation, engine M thus is supplied with a three-phase voltage system having a specifiable frequency and engine M is set into rotary motion in this manner.

Conversely, in regenerative operation, energy is supplyable from the motor via the inverter to energy sources B and C, thereby allowing them to be charged.

However, charging is also possible when motor M is not rotating. For example, when the vehicle is in the parked position, a primary winding L2 is able to be inductively coupled to a secondary winding L1 from the outside. This secondary winding L1 is part of a charge unit 2, which is connected by plug to the remaining motor-inverter unit 1.

The primary winding is supplied from a gyrator G, which in turn is supplied by a single-phase inverter which includes switches S1, S2, S3, S4 and to which the direct voltage is supplied that is applied at capacitor C2. In the process, gyrator G converts the voltage-source-type behavior of the output side of the single-phase inverter into a current-source-type behavior in the direction of secondary winding L1.

A short-circuiter R is provided in parallel to the secondary winding in order to switch off the supplied energy. If this short-circuiter R is open, the secondary alternating current is supplied to the rectifier, which includes diodes D2, D3, D4, D5, and the rectified current is supplied to energy stores B and C via diode D1.

In the event of an overvoltage or also for other protection of energy stores B and C, such as protection against overcharging, the inverter is employed for terminating the charging operation, by transferring one or more lower switch(es) of the inverter, i.e., switches disposed at the lower potential of the energy stores, into the conductive state, which causes the rectified alternating current to be rerouted via star point SP of motor M and the one, or the plurality of, stator winding(s) of motor M and the lower switch(es).

If all switches of the inverter are open, a portion of the rectified alternating current is forwarded via star point SP and the stator windings of motor M to the diodes of the inverter, which rectify the alternating current and use it to supply a unipolar current for charging energy stores B and C. In the process, the stator windings reduce high-frequency components and contribute to the smoothing.

Charging of the energy stores is also possible when voltage SP applied at the star point is lower than the required charging voltage. For then a boost-chopper operation is possible with the aid of the inductivities of the stator winding. Toward this end, the motor with inverter is used not merely for rectification, but operated as boost chopper. The switches are actuated accordingly for this purpose, so that a much higher voltage is able to be generated at the energy store than the peak voltage value of the unipolar voltage able to be generated by the rectifier. In so doing, in switching processes of the semiconductor switches of the inverter, the inductivities of the stator windings work together and allow the level of the voltage at the energy store to be controlled, or allow it to be regulated if means for detecting the voltage are installed at the energy store. An important parameter in this context is the switching frequency of the switches of the inverter. Despite a system voltage whose peak value and/or effective value is less than the charging voltage required for the energy store, it is therefore possible to charge the energy store.

In motive and/or regenerative operation of the motor, the inverter is actuated such that a three-phase voltage is applied at the motor. The actuating signals are therefore a function of each other, so that the three-phase voltage is applied at the stator windings. In the described charge operation and in the case of a non-driving or driven motor M, the actuating signals for the switches of the half-bridges may be produced independently of each other.

The actuation of the three half-bridges, i.e., pairs of arms, of the inverter is able to be implemented in synchronous manner. An asynchronous implementation of the actuating signals allows an even better, more uniform capacity utilization of the switches. Asynchronous in this context means that the actuating signals assigned to the particular half-bridges differ in their frequencies and thus are not in synchrony with each other.

Using the unipolar current, which is generated when charging the energy stores and during boost chopper operation, a holding torque is generated in the electromotor, especially when it is implemented as synchronous motor.

Closing the lower switches of the inverter makes it possible to protect the battery from overcharging or from an overvoltage.

In exemplary embodiments, an additional electronic switch is provided, which is situated between the star point and the lower potential or, alternatively, between one of the motor terminals and the lower potential, i.e., parallel to one of the lower switches. This provides even greater reliability. In particular when this additional switch is implemented as thyristor, a passive circuit which, for instance, includes a Zener diode or the like, is implementable, with whose aid the current may be shunted from the star point to the lower potential of energy stores B and C as soon as a critical voltage is exceeded that is greater than the particular critical voltage whose exceedance causes the lower switches of the inverter to be closed.

In exemplary embodiments, the switches of the inverter are actuated in block-commutated manner instead of pulse-width-modulated manner via the actuation not shown in FIG. 1.

In exemplary embodiments, the energy store is supplyable in the described manner even in motive operation of motor M, so that the capacity of the energy store is used up less rapidly, that is to say, the aforementioned charge current may be used for the at least partial supply of the inverter. However, the stator windings and the diodes of the rectifier must have suitably robust dimensions in such a case.

In exemplary embodiments, a plurality of inverters is supplied from the energy store, each feeding an electromotor; via a stator winding of a first electromotor or a plurality of electromotors, the energy store . . . in the afore-described manner . . . using at least one switch in each case for the controlled supply of current to the individual stator winding.

In exemplary embodiments, an additional inductivity L is inserted between star point SP and the rectifier (D2, D3, D4, D5), whose current is able to be influenced by a controllable switch. The switch substantially operates in the manner of a Buck converter; however, at least the stator windings and inductivity L are provided as inductivity at the star point of the stator windings, and the inverter with energy store is acting as load.

A diode is switched in parallel to the switch, preferably a semiconductor switch, this parallel circuit being connected to the lower potential of the unipolar voltage via the diode switched in series.

This makes it possible to supply an alternating current to the start point by the switch, so that a charge current is supplyable to the energy store via the diodes of inverter 1. This makes it possible to recharge the energy store.

In exemplary embodiments, the stator windings have a smoothing effect on the current supplied via the switch, and they also constitute an additional energy store.

The invention claimed is:

1. A drive system, comprising:
an electromotor;
an inverter; and
an energy store;
wherein the electromotor is suppliable from the inverter and the inverter is suppliable from the energy store;
wherein the electromotor is arranged as three-phase AC motor in a star connection;
wherein a star point of the electromotor is suppliable with current from a rectifier, which is suppliable from a secondary winding; and
wherein the secondary winding suppliable from a primary winding, which is inductively coupled to the secondary winding;
wherein if a first critical value of a voltage at the star point is exceeded, a charge current is discharged directly from the rectifier to the energy store with the aid of a diode, the first critical value corresponding to a charging voltage for the energy store;
wherein if the first critical value of the voltage at the star point is undershot, the charge current is routed from the rectifier to the energy store via at least one stator winding and the inverter, the inverter and stator windings being operable as a boost chopper; and
wherein if a second critical value which is greater than the first critical value is exceeded, a switch is closed, via which current is shunted from the star point to a lower potential, to protect the energy store from overcharging.

2. The drive system according to claim 1, wherein the primary winding is suppliable from at least one of (a) a voltage-current converter and (b) a gyrator, which is suppliable with an alternating voltage from an inverter, the voltage-current converter including at least one capacitance and one inductance such that an associated resonant frequency substantially corresponds to a frequency of the alternating voltage, the capacitance and the inductance being connected in series.

3. The drive system according to claim 1, wherein at least one energy store is implemented as at least one of (a) a capacitor, (b) an ultracap capacitor, and (c) a battery.

4. The drive system according to claim 1, wherein stator windings of the electromotor are interconnected in a star connection.

5. The drive system according to claim 1, wherein an additional inductance provided between the star point and the rectifier feeding the star point.

6. The drive system according to claim 1, wherein at least one of (a) an effective value an (b) a peak value of voltage that supplies the rectifier and arises at the secondary winding is lower than a charging voltage for the energy store, and lower than a voltage required to charge the energy store and an input voltage of the inverter.

7. The drive system according to claim 5, wherein the inverter forms a chop booster with at least one stator winding, together with the additional inductance, to which current from the rectifier is supplied, and which makes charge current available to the energy store.

8. A method for operating a drive system including an electromotor which is suppliable from an energy store, comprising:
operating the electromotor in a star connection;
supplying current from a secondary winding to a rectifier;
supplying current from the rectifier to a star point of the electromotor;
supplying current from a primary winding to the secondary winding in contactless manner; and
producing a charge current for the energy store by an inverter, via which stator windings of the electromotor are suppliable using a three-phase voltage system, which is produced in motive operation when the inverter is supplied from the energy store, as long as the voltage arising at the star point lies below a first critical value;
wherein if a first critical value of a voltage at the star point is exceeded, a charge current is discharged directly from the rectifier to the energy store with the aid of a diode, the first critical value corresponding to a charging voltage for the energy store;
wherein if the first critical value of the voltage at the star point is undershot, the charge current is routed from the rectifier to the energy store via at least one stator winding and the inverter, the inverter and stator windings being operable as a boost chopper; and
wherein if a second critical value which is greater than the first critical value is exceeded, a switch is closed, via which current is shunted from the star point to a lower potential, to protect the energy store from overcharging.

9. The method according to claim 8, wherein at least one of (a) the charge current is supplied to the energy store directly from the rectifier as long as the voltage arising at the star point lies above the first critical value, (b) at least one lower switch of the inverter is transferred into a conducting state, so that current is shunted from the rectifier via an associated stator winding to a lower potential of the energy store, so that the energy store is protected from current from the rectifier, as long as the voltage arising at the star point lies above a second critical value which is greater than the first critical value, and an exceedance of which may pose a certain risk to the energy store, and (c) an additional current path is enabled, via which current from the rectifier is shunted one of (i) directly and (ii) via the associated stator winding, to the lower potential of the energy store, so that the energy store is protected from current from the rectifier, as long as the voltage arising at the star point lies above a third critical value which is greater than the second critical value, whose exceedance has a greater likelihood of posing a risk to the energy store, the additional current path being formed by a passive circuit system, the additional current path including a thyristor, in whose control path at least one of (i) a Zener diode and (ii) a component corresponding to a breaker shaft is provided.

10. The method according to claim 8, wherein at least one of (i) the inverter is actuated in at least one of (a) pulse-width-modulated and (b) block-commutated manner, for at least one of (a) a motive and (b) a regenerative operation of the electromotor, and (ii) the inverter is arranged as multi-phase inverter, and during charging of the energy store actuating signals for switches of the inverter are implemented at least one of (a) in synchrony, (b) in synchrony at a time offset, and (c) in asynchrony.

11. The method according to claim 8, wherein recharging of the energy store is repeated cyclically, the recharging being performed in alternation with at least one of (a) a motive and (b) a regenerative operation of the electromotor.

12. A system comprising:
a stator winding of an electromotor arranged as an inductance of at least one of (a) a charging circuit, (b) a Buck converter, and (c) a boost chopper, adapted to charge an energy store;

wherein a star point of the electromotor is suppliable with current from a rectifier, which is suppliable from a secondary winding; and wherein the secondary winding suppliable from a primary winding, which is inductively coupled to the secondary winding;

wherein if a first critical value of a voltage at a star point is exceeded, a charge current is discharged directly from the rectifier to the energy store with the aid of a diode, the first critical value corresponding to a charging voltage for the energy store; and wherein if the first critical value of the voltage at the star point is undershot, the charge current is routed from the rectifier to the energy store via the stator winding and an inverter, the inverter and stator windings being operable as the boost chopper; and wherein if a second critical value which is greater than the first critical value is exceeded, a switch is closed, via which current is shunted from the star point to a lower potential, to protect the energy store from overcharging.

* * * * *